United States Patent [19]

Huang

[11] Patent Number: 5,188,516

[45] Date of Patent: Feb. 23, 1993

[54] HYDRAULIC/PNEUMATIC PUMP

[76] Inventor: Yuh T. Huang, No. 2, Lane 177, Chungcheng N. Rd., Yungkang Hsiang, Tainan Hsien, Taiwan

[21] Appl. No.: 763,208

[22] Filed: Sep. 20, 1991

[51] Int. Cl.⁵ .................. F04B 23/08; F04B 23/14; F04B 33/10
[52] U.S. Cl. .................. 417/199.1; 417/201; 417/204
[58] Field of Search .................. 417/413, 415, 199.1, 417/201, 204, 424.1

[56] References Cited

U.S. PATENT DOCUMENTS

| | | | |
|---|---|---|---|
| 2,009,921 | 7/1935 | Hayakawa | 417/201 |
| 2,542,896 | 2/1951 | Brady | 417/424.1 |
| 3,744,635 | 7/1973 | Horvath | 417/199.1 |
| 4,990,066 | 2/1991 | Kern | 417/413 |

Primary Examiner—Richard A. Bertsch
Assistant Examiner—Alfred Basichas
Attorney, Agent, or Firm—Poms, Smith, Lande & Rose

[57] ABSTRACT

A hydraulic/pneumatic pump for an aquarium includes a motor having an upper output shaft enclosed by an upper casing and a lower output shaft enclosed by a lower casing, a hydraulic pump assembly driven by the lower output shaft, and a pneumatic pump assembly driven by the upper output shaft. The hydraulic pump assembly pumps water from the aquarium to be filtered via an inlet pipe thereof and outputs water to a filter unit via an outlet pipe thereof. The pneumatic pump assembly includes a ring mounted on the upper output shaft, an impinging member securely mounted on an upper surface of the ring, an actuating pin, a return spring, an air bag, a lower chamber, an upper chamber, and a variable chamber defined by the air bag. Air is sucked into the variable chamber via an inlet opening in the body and the lower chamber when the impinging member disengages with the actuating pin to release the air bag by the return spring. The intake air in the variable chamber is exhausted via the upper chamber and an outlet opening when the air bag is compressed upon impingement of the impinging member on the actuating pin.

5 Claims, 5 Drawing Sheets

HYDRAULIC/PNEUMATIC PUMP

BACKGROUND OF THE INVENTION

The present invention relates to a hydraulic/pneumatic pump for aquaria which pumps water and air at the same time.

Conventionally, one has to separately utilize a water pump for filtration of water in an aquarium and utilize a pneumatic pump to pump air into the aquarium, which occupies a large space in addition to increasing cost and energy consumption.

The present invention provides a hydraulic/pneumatic pump which serves as a water pump as well as an air pump.

SUMMARY OF THE INVENTION

The present invention provides a hydraulic/pneumatic pump including a motor having an upper output shaft and a lower output shaft, a hydraulic pump assembly driven by the lower output shaft, and a pneumatic pump assembly driven by the upper output shaft.

The hydraulic pump assembly includes a water chamber, an inlet pipe, an output pipe, and a blade means driven by the lower output shaft. When the blade means is driven by the lower shaft, water in an aquarium is sucked into the water chamber via the inlet pipe and is then outputted via the outlet pipe to a filter means by which water is filtered before it circles to the aquarium.

The pneumatic pump assembly includes an impinging member driven by the upper output shaft, an air bag, and a return spring. When the impinging member impinges an actuating pin to compress the air bag and the return spring, air in the air bag is pumped out of the pneumatic pump assembly via an air output thereof, which is subsequently conducted into the aquarium for supplying oxygen to fish. When the impinging member disengages with the actuating pin, the return spring returns the actuating pin and the air bag to an original uncompressed manner, thereby pumping atmospheric air into the air bag via an air inlet of the hydraulic pump assembly for the next pumping.

Accordingly, it is a primary object of the present invention to provide a hydraulic/pneumatic pump which simultaneously pumps air and water, being economical in energy consumption and occupying a small space.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
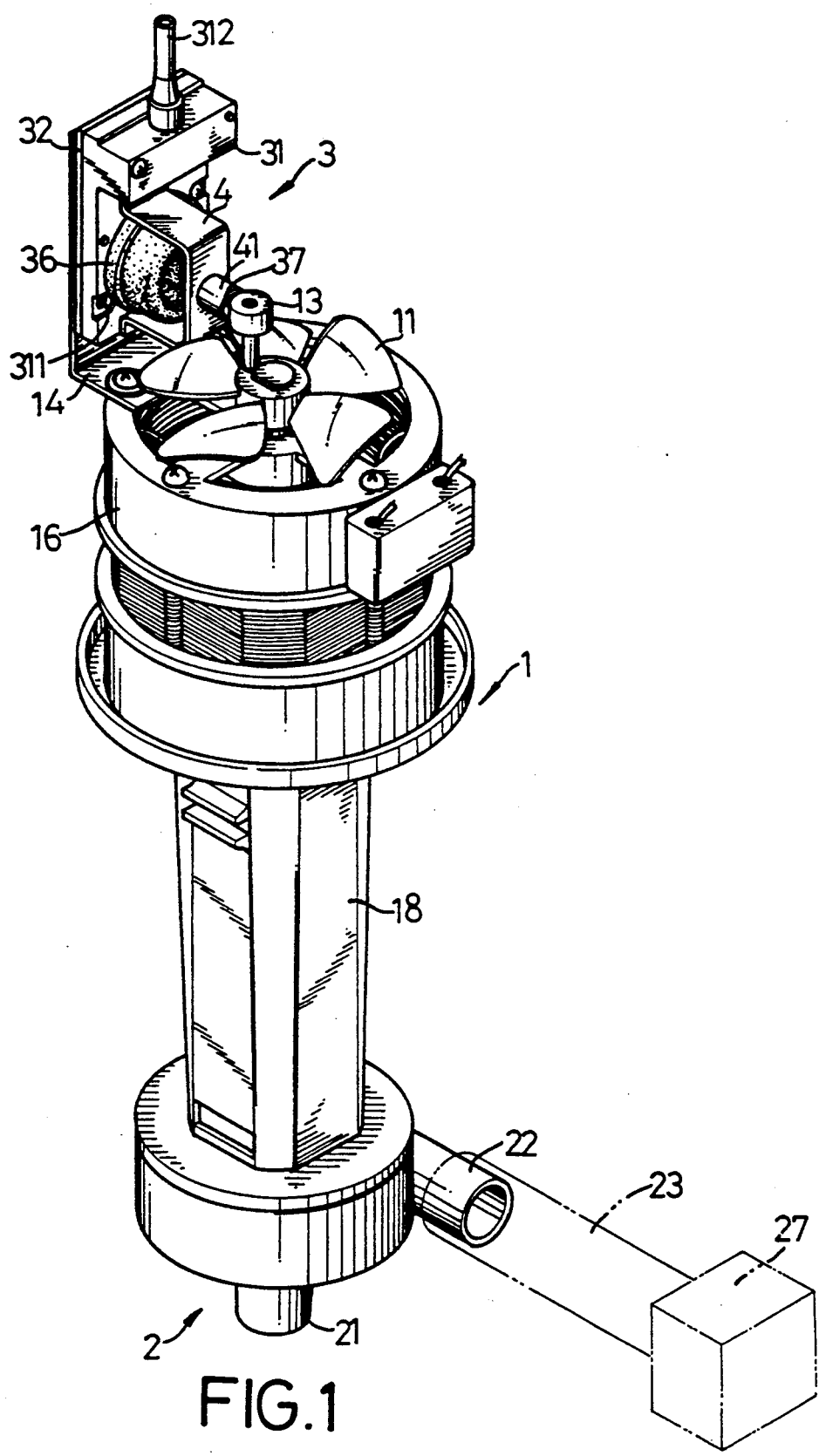
FIG. 1 is a perspective view of a hydraulic/pneumatic pump according to the present invention.
Figure 2:
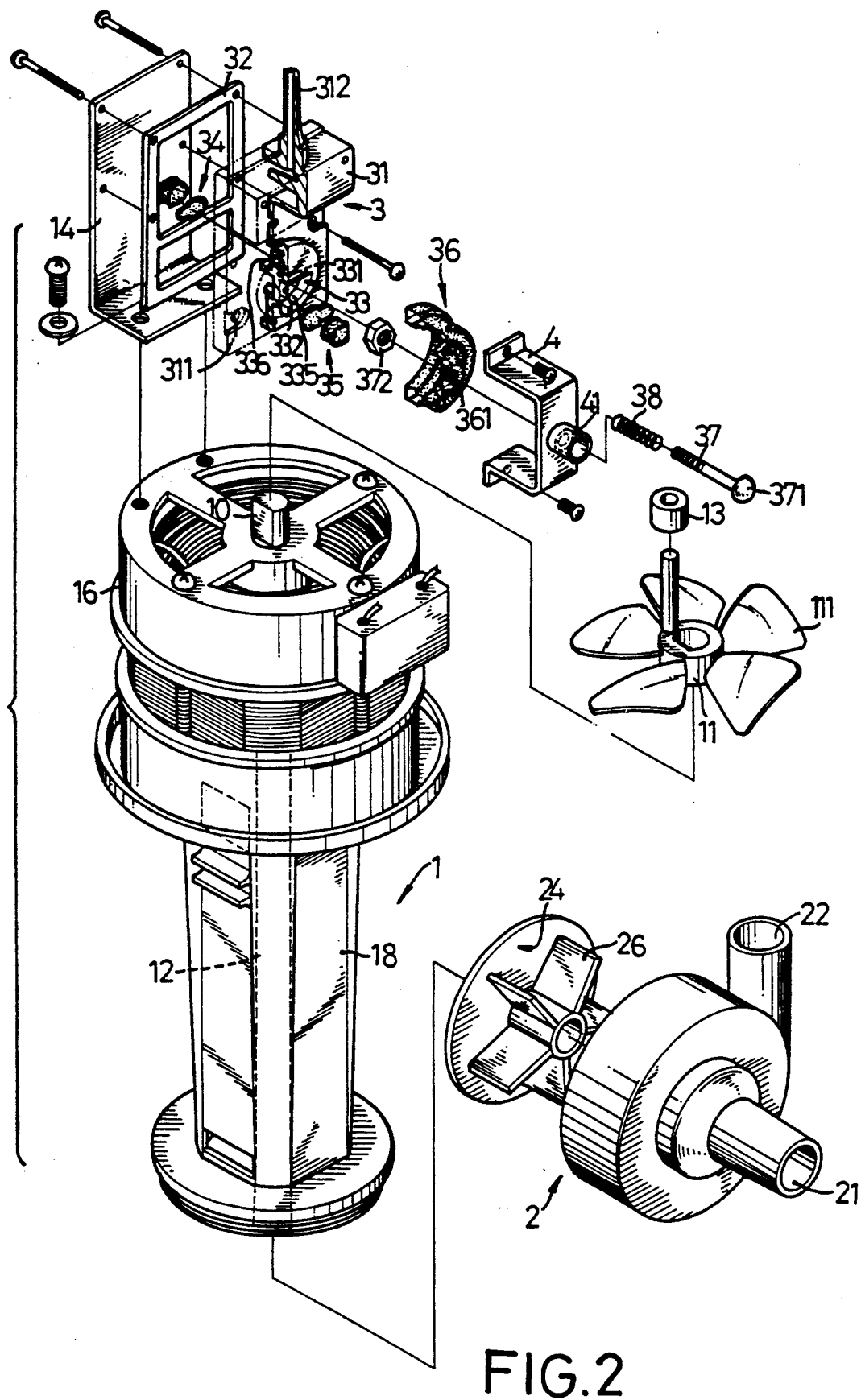
FIG. 2 is an exploded perspective view of the hydraulic/pneumatic pump.

Referring to FIGS. 1 and 2, a hydraulic/pneumatic pump according to the present invention includes a motor 1 having an upper output shaft 10 enclosed by an upper casing 16 and a lower output shaft 12 (see the dash lines) enclosed by a lower casing 18, a hydraulic pump assembly 2 driven by the lower output shaft 12, and a pneumatic pump assembly 3 driven by the upper output shaft 10.

The hydraulic pump assembly 2 includes a water chamber 24, an inlet pipe 21 in fluid communication with the water chamber 24, an output pipe 22 also in fluid communication with the water chamber 24, and a blade means 26 driven by the lower output shaft 12. When the blade means 26 is driven by the lower output shaft 12, water in an aquarium (not shown) is sucked into the chamber 24 via the inlet pipe 21 and then exits the hydraulic pump assembly 2 via the outlet pipe 22. As shown in FIG. 1, via a communication pipe 23, the outlet pipe 22 communicates with a filter means 27 by which water is filtered before it circles to the aquarium.

The pneumatic pump assembly 3 includes a ring 11 mounted on the upper output shaft 10. Alternatively, the ring 11 can be integral with the upper output shaft 10. A plurality of fan blades 111 protrude from a peripheral wall of the ring 11 for dissipating heat generated during operation of the motor 1. An impinging member 13 is securely mounted on an upper surface of the ring 11, which will be discussed later.

A mount plate 14 is securely mounted on the upper casing 16 without interfering with the operation of the fan blades 111. A body 31 is mounted to the mount plate 14, thereby defining an air chamber (not labeled) therebetween. Preferably, a gasket 32 is provided between the mount plate 14 and the body 31 for sealing. Still referring to FIGS. 1 and 2, and further to FIGS. 3 and 4, the body 31 has a substantially circular seat member 33 which has a separation wall 333 extending from an inner surface thereof to the mount plate 14 for separating the air chamber into a lower chamber 52 and an upper chamber 54. An inlet opening 311 is formed in a lower portion of the body 31 for communicating the lower chamber 52 with the ambient atmosphere. In addition, an outlet opening 312 is provided in an upper portion of the body 31 for communicating the upper chamber 54 with an air outlet pipe 60 through which output air can flow into the water of the aquarium for supplying oxygen to fish therein.

An air bag 36 made of resilient material is mounted to an outer side of the body 31 around the seat member 33, and thus seals the seat member 33. A variable chamber 56 is defined between the seat member 33 and the air bag 36. The seat member 33 has a lower recess 335 facing the variable chamber 56 and fluidly communicating with the lower chamber 52 via a lower channel 332 in the seat member 33. A lower check means 35 is provided in the lower recess 335, such that air is only flowable from the lower chamber 52 into the variable chamber 56 via the lower channel 332. The seat member 33 further has an upper recess 336 facing the upper chamber 54 and fluidly communicating with the variable chamber 56 via an upper channel 331 in the seat member 33. An upper check means 34 is provided in the upper recess 336, such that air is only flowable from the variable chamber 56 into the upper chamber 54 via the upper channel 331.

Figure 3:
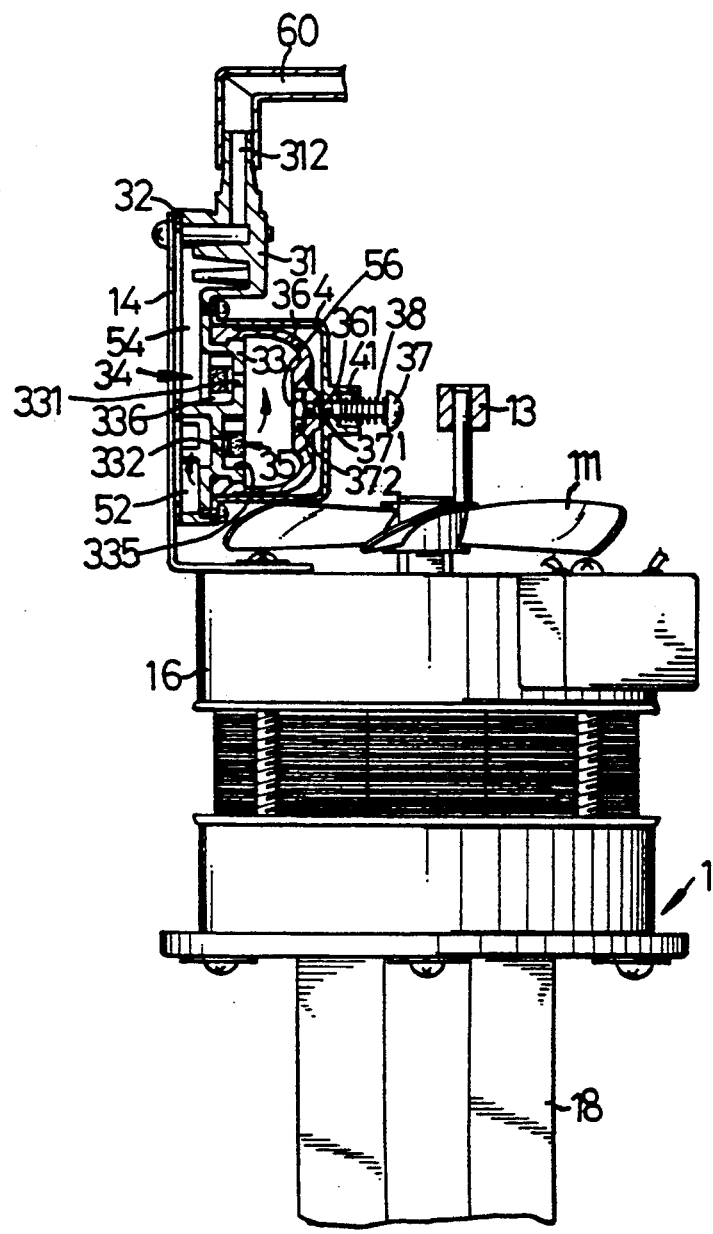
FIG. 3 is a fragmentary, partially sectional side view of the hydraulic/pneumatic in which a pneumatic pump assembly thereof is in an intake stroke.
Figure 4:
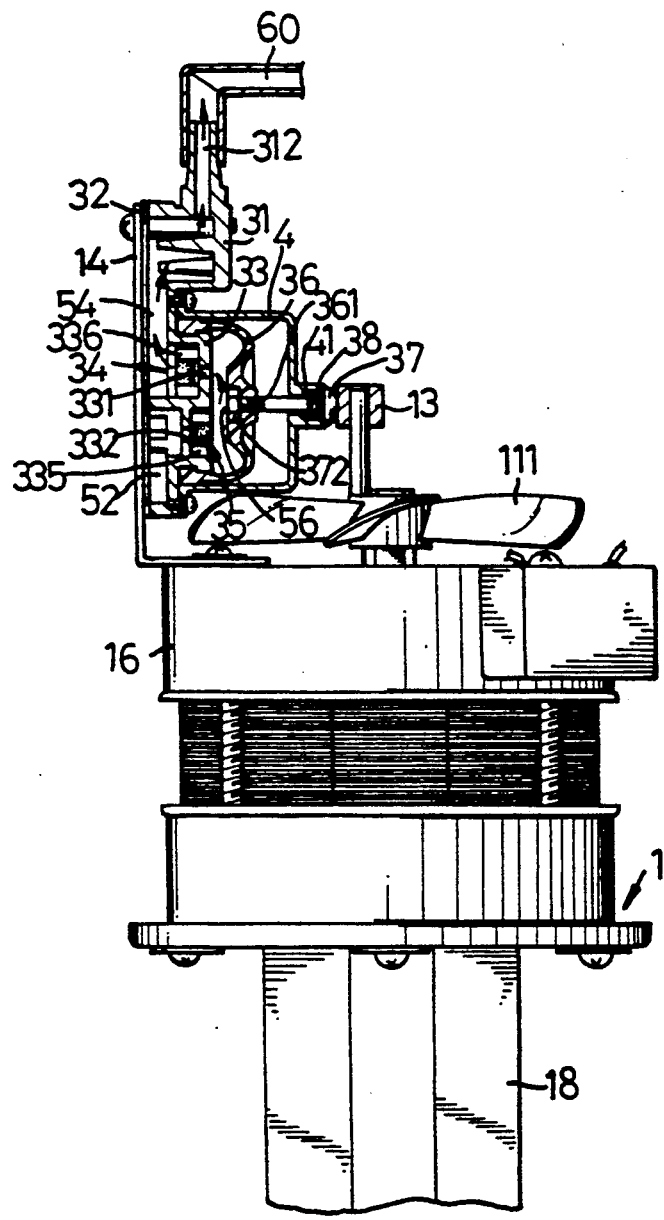
FIG. 4 is a view similar to FIG. 3 in which the pneumatic pump assembly is in an exhaust stroke.

Referring to FIGS. 3 and 4, a substantially U-shaped support 4 is securely attached to the body 31. The U-shaped support 4 has a through hole (not labeled) in a middle portion thereof through which an actuating pin 37 passes. A flange 41 is formed on the U-shaped support 4 around the through hole for receiving a first end of a return spring 38 whose second end is restrained by an anvil end 371 of the actuating pin 37. The other end of the actuating pin 37 is threaded and passes through a central threaded opening 361 formed in an operating wall of the resilient rubber cover 36, and is fixed by a nut 372 behind the central threaded opening 361.

OPERATION

When the motor 1 operates, the upper and lower output shafts 10 and 12 simultaneously rotate. The lower output shaft 12 drives the hydraulic pump assembly for filtration of water in the aquarium, whose operation has been described in detail and thus will not be repeated here.

Figure 5:
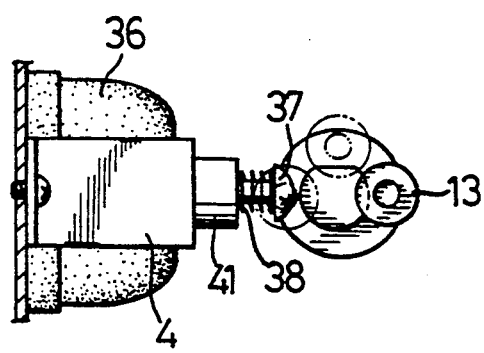
FIG. 5 is a schematic view showing operation of an impinging member and an actuator of the pneumatic pump assembly.

Referring to FIGS. 3 and 4, and further to FIG. 5, assuming the hydraulic pump assembly is initially in a status shown in FIG. 3, when the impinging member 13 is driven by the upper output shaft 10 to a leftward position to impinge the actuating pin 37, the actuating pin 37 moves leftward to compress the air bag 36 and the return spring 38 is compressed. The air inside the variable chamber 56 is "squeezed" into the upper chamber 54 via the upper channel 331, which subsequently exits the pneumatic pump assembly to the aquarium via the air outlet 312 and the output conduit 60 (see arrows in FIG. 4). Thereafter, the impinging member 13 disengages with the actuating pin 37 and the return spring 38 returns the air bag 36 to its uncompressed status shown in FIG. 3, which results in a suction of atmospheric air into the variable chamber 56 via the air inlet 311, the lower chamber 52, and the lower channel 332 during the expansion of the air bag 36. At the next impingement of the actuating pin 37, the newly intaken air in the variable chamber 56 is "squeezed" out of the pneumatic pump assembly. Such a procedure continues until the motor 1 is stopped.

Although the invention has been explained in relation to its preferred embodiment, it is to be understood that many other possible modifications and variations can be made without departing the spirit and scope of the invention as hereinafter claimed.

I claim:

1. A hydraulic/pneumatic pump for an aquarium comprising:

a motor having a first output shaft enclosed by a first casing and a second output shaft enclosed by a second casing;

a hydraulic pump assembly including an inlet pipe, an output pipe, a water chamber in fluid communication with said inlet and outlet pipes, and a blade means drivable by said first output shaft for sucking water of the aquarium to be filtered to a filter means via said inlet pipe, said water chamber, and said outlet pipe;

a pneumatic pump assembly including an impinging member drivable by said second output shaft, a mount plate securely mounted on said casing, and a body securely mounted to said mount plate, thereby defining an air chamber therebetween, said body having a seat member separating said air chamber into a first chamber and a second chamber, an inlet opening being formed in said body for communicating said first chamber with atmosphere, an outlet opening being formed in said body for communicating said second chamber with an outlet pipe through which outlet air is flowable into water of the aquarium, an air bag being mounted to an outer side of said body around said seat member and defining a variable chamber between said seat member and said air bag, said seat member having a first recess facing said variable chamber and fluidly communicating with said first chamber via a first channel in said seat member, a first check means being provided in said first recess, such that air is only flowable from said first chamber into said variable chamber via said first channel, said seat member having a second recess facing said second chamber and fluidly communicating with said variable chamber via a second channel in said seat member, a second check means being provided in said second chamber, such that air is only flowable from said variable chamber into said second chamber via said second channel, an actuating pin being securely attached to said air bag and being supported by a support, a return spring having a first end mounted to said support and a second end mounted to said actuating pin, whereby air is sucked into said variable chamber via said inlet opening, said first chamber, and said first channel when said impinging member disengages with said actuating pin to release said air bag by said return spring, and the intaken air in said variable chamber is exhausted to said outlet pipe via said second channel, said second chamber, and said outlet opening when said air bag is compressed upon impingement of said impinging member on said actuating pin.

2. The hydraulic/pneumatic pump as claimed in claim 1, wherein said first and second chambers are separated by a separation wall extending from an inner surface of said seat member to said mount plate.

3. The hydraulic/pneumatic pump as claimed in claim 1, wherein said impinging member is securely mounted on an upper surface of a ring which is securely mounted on said second output shaft.

4. The hydraulic/pneumatic pump as claimed in claim 1, further comprising a plurality of fan blades protruding from a peripheral wall of said ring for dissipating heat generated by said motor.

5. The hydraulic/pneumatic pump as claimed in claim 1, further comprising a gasket between said mount plate and said body for sealing.

* * * * *